US010249212B1

United States Patent
Hines

(10) Patent No.: US 10,249,212 B1
(45) Date of Patent: Apr. 2, 2019

(54) USER ATTRIBUTE ANALYSIS SYSTEM

(71) Applicant: Vernon Douglas Hines, St. Petersburg, FL (US)

(72) Inventor: Vernon Douglas Hines, St. Petersburg, FL (US)

(*) Notice: Subject to any disclaimer, the term of this patent is extended or adjusted under 35 U.S.C. 154(b) by 484 days.

(21) Appl. No.: 15/147,583

(22) Filed: May 5, 2016

Related U.S. Application Data

(60) Provisional application No. 62/158,741, filed on May 8, 2015.

(51) Int. Cl.
 *A63F 9/24* (2006.01)
 *G09B 19/00* (2006.01)
 *G09B 5/02* (2006.01)
 *G09B 7/00* (2006.01)

(52) U.S. Cl.
 CPC ............ *G09B 19/00* (2013.01); *G09B 5/02* (2013.01); *G09B 7/00* (2013.01)

(58) Field of Classification Search
 CPC .............................. G09B 19/00; G09B 9/052
 See application file for complete search history.

(56) References Cited

U.S. PATENT DOCUMENTS

| | | | |
|---|---|---|---|
| 9,047,648 B1 | 6/2015 | Lekutai et al. | |
| 9,318,108 B2 | 4/2016 | Gruber et al. | |
| 2004/0172317 A1* | 9/2004 | Davis | G06Q 10/0635 705/80 |
| 2010/0223212 A1* | 9/2010 | Manolescu | G06Q 10/06 706/12 |
| 2013/0085785 A1* | 4/2013 | Rogers | G06Q 10/06 705/4 |
| 2014/0278506 A1* | 9/2014 | Rogers | G06F 19/00 705/2 |
| 2014/0316931 A1* | 10/2014 | Selcuk | G06Q 30/0643 705/26.5 |

OTHER PUBLICATIONS

"Top Gun Sales Performance," accessed on May 2, 2016, URL: http://topgunhq.com/, 9 pages.
GoReact, "Affordable Online Video Assessment," accessed on May 2, 2016 URL: https://goreact.com/190 /, 2 pages.
GoReact, "Features," accessed on May 2, 2016 URL: https://goreact.com/features/, 6f pages.

(Continued)

*Primary Examiner* — Steve Rowland
(74) *Attorney, Agent, or Firm* — Fish & Richardson P.C.

(57) ABSTRACT

Methods, systems, and apparatus, including computer programs encoded on computer storage media, for providing user attribute prompts. One wearable attribute tracking device may include one or more user attribute sensors, a speaker, and a display and perform operations including: receiving, from the user attribute sensors, user attribute data for a user wearing the wearable attribute tracking device, determining target attribute data for the user, comparing the user attribute data with the target attribute data to determine attribute differences, determining historical data for the user, determining an attribute prompt using the attribute differences and the historical data, and providing, for presentation to the user by at least one of the speaker or the display, the attribute prompt.

13 Claims, 5 Drawing Sheets

(56) References Cited

OTHER PUBLICATIONS

Grovo, "Learning Management System, Employee Training Content," accessed on May 2, 2016 URL: https://www.grovo.com/, 7 pages.
Hines, "Healthy Like the Coaches," PerfectCoaches®, The VARI Group LLC, 2015, 111 pages.
Hines, "Selling Like the Coaches, Winning Habits for Sales, Service, and Leadership," PerfectCoaches®, The VARI Group LLC, 2016, 99 pages.
Hines, "Think Coaches, Your Companions in Life-Long Learning," PerfectCoaches®, The VARI Group LLC, 2016, 119 pages.
Maestro, "Homepage," accessed on May 2, 2016, URL: http://meetmaestro.com/, 7 pages.
Mindmarker, "The Leader in Training Reinforcement," accessed on May 2, 2016, URL: http://www.mindmarker.com/, 8 pages.
Mobile Coach, "Home," accessed on May 2, 2016, URL: http://mobilecoach.com/, 4 pages.
Obsidian, "About Obsidian Learning," accessed on May 2, 2016, URL: http://obsidianlearning.com/about/, 4 pages.
Obsidian, "Obsidian Learning Home," accessed on May 2, 2016, URL: http://obsidianlearning.com/, 3 pages.
Origin Learning, "eLearning Solutions, Content Development," accessed on May 2, 2016, URL: http://orginlearning.com/, 3 pages.
Origin Learning, "eLearning Solutions, Custom eLearning Development," accessed on May 2, 2016, URL: http://orginlearning.com/content/elearning/, 3 pages.
Pathgather, "Think outside the LMS, Transform the way your organization learns and empower your workforce," accessed on May 2, 2016, URL: https://pathgather.com/, 4 pages.
Scrimmage, "Mobile Learning Tool," accessed on May 2, 2016, URL: https://www.wescrimmage.com/, 7 pages.
Scrimmage, "The Scrimmage Platform," accessed on May 2, 2016, URL: https://www.wescrimmage.com/platform/overview, 4 pages.
Train by Cell, "Mobile Solutions for your Workforce," accessed on May 2, 2016, URL: https://trainbycell.com/, 8 pages.
Xentor Solutions, "Do you want to build increased sales force momentum?," accessed on May 2, 2016, URL:http://www.xentor.com/, 5 pages.
Xentor Solutions, "What we do," accessed on May 2, 2016, URL:http://www.xentor.com/whatwedo.html, 4 pages.

* cited by examiner

USER ATTRIBUTE ANALYSIS SYSTEM

BACKGROUND

This specification relates to a system that monitors a user's attributes and prompts the user based on the attributes.

Devices may capture user input. Some examples of user input include voice input, keyboard input, mouse input, and touch screen input.

SUMMARY

In general, one innovative aspect of the subject matter described in this specification can be embodied in a wearable attribute tracking device that includes one or more user attribute sensors, a speaker, and a display. The wearable attribute tracking device may perform the actions of receiving, from the user attribute sensors, user attribute data for a user wearing the wearable attribute tracking device, determining target attribute data for the user, comparing the user attribute data with the target attribute data to determine attribute differences, determining historical data for the user, determining an attribute prompt using the attribute differences and the historical data, and providing, for presentation to the user by at least one of the speaker or the display, the attribute prompt. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving data to generate a user interface on a computer display device, and generating, using the data, the user interface on the computer display device, wherein the user interface includes a user attribute field to receive first user input that indicates attributes of a user, a target attribute field that identifies a target attribute that is different from the attributes of the user, an implementation field that indicates a suggestion for how the user can achieve the target attribute, an activity entry field to receive second user input that indicates one or more activities performed by the user to attain the target attribute, and a feedback field to provide a prompt to the user based on an analysis of data entered in the activity entry field, wherein the operations include analyzing the second user input entered into the activity entry field to determine one or more keywords, and generating the prompt for the feedback field using the one or more keywords. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving, via a network from a first device operated by a first user, first data defining a best practice for a particular entity from the entities, storing, in a first database, the first data as one of the best practices and data that associates the first data with the particular entity, receiving, via the network from a second device operated by a second user associated with the particular entity, second data that defines attributes of the second user with respect to the particular entity, storing, in a second database, the second data and associating the second data with the second user and the particular entity, automatically determining, using first data from the first database and second data from the second database, differences between the best practices for the particular entity and the attributes of the second user with respect to the particular entity in response to receiving the second data that defines the attributes of the second user with respect to the particular entity, automatically determining, using the differences, a question to provide to the second user for actions the second user can perform to change the attributes of the second user with respect to the particular entity and to increase a likelihood that the second user will perform the best practice of the particular entity, and providing instructions for presentation of the question to the second device operated by the second user. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include repeatedly receiving, from the user attribute sensors, updated user attribute data for the user, in response to each of two or more receipts of the updated user attribute data: determining a second attribute prompt using the respective updated user attribute data, and providing, for presentation to the user, the second attribute prompts, analyzing the updated user attribute data and the second attribute prompts to determine i) differences between the target attribute data and each set of the updated user attribute data, and ii) a correlation between the differences and the second attribute prompts, generating a third attribute prompt using i) the differences between the target attribute data and each set of the updated user attribute data, and ii) the correlation between the differences and the second attribute prompts, and providing, for presentation to the user, the third attribute prompt. Analyzing the updated user attribute data and the second attribute prompts to determine i) the differences between the target attribute data and each set of the updated user attribute data, and ii) the correlation between the differences and the second attribute prompts may include determining, for each set of the updated user attribute data, a difference between a target attribute indicated by the target attribute data and a current user attribute indicated by the updated user attribute data, determining, for each set of the updated user attribute data, a preceding prompt from the attribute prompt and the second attribute prompts, determining, for each set of the updated user attribute data, a correlation between a) the difference between the target attribute and the current user attribute and b) the preceding prompt, and using the correlation to determine a likely effectiveness of each of the preceding prompts. Generating the third attribute prompt using i) the differences between the target attribute data and each set of the updated user attribute data, and ii) the correlation between the differences and the second attribute prompts may include generating the third attribute prompt using the likely effectiveness of each of the preceding prompts.

In some implementations, the user attribute sensors may include a microphone. Receiving the user attribute data for the user wearing the wearable attribute tracking device may include receiving, from the microphone, a plurality of spoken utterances. The method may include determining a subset of the plurality of spoken utterances spoken by the user using one or more first features of the plurality of spoken utterances and one or more second features of the user, extracting, from each spoken utterance in the subset of the plurality of spoken utterances determined to have been spoken by the user, one or more keywords, and determining the user attribute data using the keywords. The display may be a touch screen display. The wearable attribute tracking device may be a three-dimensional virtual reality head set or a smart watch. Providing, for presentation to the user, the attribute prompt may include causing presentation of the attribute prompt on the display. Providing, for presentation to the user, the attribute prompt may include causing presentation of the attribute prompt by the speaker. Providing, for presentation to the user, the attribute prompt may include enabling the user to communicate with another user about a target attribute identified in the target attribute data. Determining the target attribute data for the user may include determining a role for the user, and determining the target attribute data for the user using the role for the user.

In some implementations, the method may include receiving, from the second device operated by the second user, third data that describes actions performed by the second user with respect to the particular entity, determining whether the actions performed by the second user with respect to the particular entity indicate a change to the attributes of the second user, in response to determining that the actions performed by the second user with respect to the particular entity do not indicate a change to the attributes of the second user: determining second feedback to provide to the second user for second actions the second user can perform to change the attributes of the second user with respect to the particular entity and to increase a likelihood that the second user will perform the best practice of the particular entity, and providing instructions for presentation of the feedback to the second device operated by the second user, and in response to determining that the actions performed by the second user with respect to the particular entity indicate a change to the attributes of the second user: determining new attributes for the second user with respect to the particular entity based on the action, automatically determining, using first data from the first database and second data from the second database, second differences between the best practices for the particular entity and the new attributes of the second user with respect to the particular entity in response to determining the new attributes for the second user with respect to the particular entity, automatically determining, using the second differences, second feedback to provide to the second user for actions the second user can perform to change the new attributes of the second user with respect to the particular entity and to increase a likelihood that the second user will perform the best practice of the particular entity, and providing instructions for presentation of the second feedback to the second device operated by the second user.

In some implementations, the method may include repeatedly receiving updated second data that defines attributes of the second user, in response to each of two or more receipts of the updated second data: determining a second question using the respective updated second data, and providing instruction for presentation of the second question, analyzing the updated second data and the second questions to determine i) differences between the first data and each set of the updated second data, and ii) a correlation between the differences and the second questions, generating a third question using i) the differences between the first data and each set of the updated second data, and ii) the correlation between the differences and the second questions, and providing, for presentation to the second user, the third question. Analyzing the updated second data and the second questions to determine i) the differences between the first data and each set of the updated second data, and ii) the correlation between the differences and the second questions may include determining, for each set of the updated second data, a difference between the best practice indicated by the first data and the attributes of the second user indicated by the updated second data, determining, for each set of the updated second data, a preceding question from the question and the second questions, determining, for each set of the updated second data, a correlation between a) the difference between the best practice and the attributes of the second user and b) the preceding question, and using the correlation to determine a likely effectiveness of each of the preceding questions, and generating the third question using i) the differences between the first data and each set of the updated second data, and ii) the correlation between the differences and the second questions comprises generating the third question using the likely effectiveness of each of the preceding questions.

The subject matter described in this specification can be implemented in particular embodiments and may result in one or more of the following advantages. In some implementations, the systems and methods described below may prompt a user to increase a likelihood that the user will develop target attributes.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
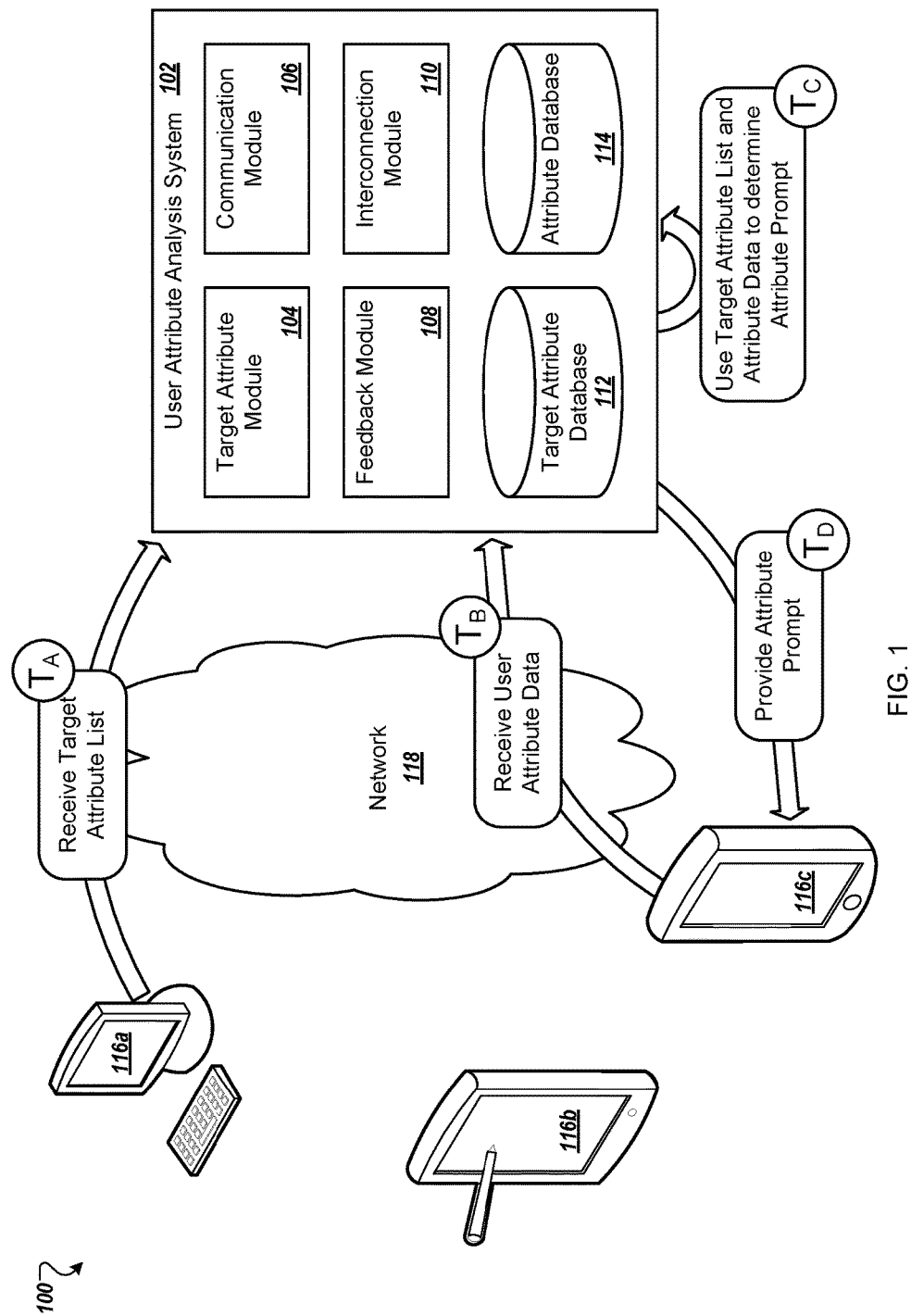
FIG. 1 is an example of an environment in which a user attribute analysis system receives user attribute data, analyzes the user attribute data, and provides prompts using the analysis of the user attribute data.

FIG. 1 is an example of an environment 100 in which a user attribute analysis system 102 receives user attribute data, analyzes the user attribute data, and provides prompts using the analysis of the user attribute data. For instance, the user attribute analysis system 102 may receive the user attribute data from one or more user devices 116a-c and provide a prompt to the same user device 116a-c or a different user device 116a-c.

The user devices 116a-c may include smart watches, virtual reality headsets, holographic image generators, personal computers, mobile communication devices, and other devices that can send and receive data over a network 118. The network 118, such as a local area network (LAN), wide area network (WAN), the Internet, or a combination thereof, connects the user devices 116a-c and the user attribute analysis system 102.

The user attribute analysis system 102 receives, during a time period TA, a list of target attributes from the first user device 116a. The user device 116a may be operated by a first user who defines each of the target attributes. For example, the user attribute analysis system 102 receives the list of target attributes, via the network 118, from the first user device 116a and provides the list of target attributes to a target attribute module 104.

The target attribute module 104 stores each of the target attributes in a target attribute database 112. For instance, the target attribute module 104 uses any appropriate method to determine the separate target attributes in the list of target attributes and stores each of the separate target attributes in the target attribute database 112. In some implementations, the target attribute module 104 may receive multiple lists of target attributes, e.g., from different user devices 116a-c.

The target attribute module 104 may analyze each of the multiple lists of target attributes to determine a ranking of the target attributes. For instance, the target attribute module 104 may identify a frequency with which each of the target attributes is included on the multiple lists and use the frequency to determine the ranking of the target attributes.

The user attribute analysis system 102 includes a communication module 106 that receives, during a time period TB, user attribute data from the user devices 116a-c. For example, a second user device 116c, operated by a second user, may monitor user attributes for the second user and provide data representing the user attributes to the communication module 106. The second user device 116c may include one or more sensors, e.g., a microphone, a camera, or both, that capture the user attribute data. The second user device 116c may analyze the captured user attribute data to determine user attribute data to send to the user attribute analysis system 102 and the communication module 106.

The communication module 106 receives the user attribute data from the second user device 116c, via the network 118, and stores at least some of the user attribute data in an attribute database 114. For instance, the communication module 106 may determine an account for the user. The communication module 106 may use information for the account when storing the user attribute data in the attribute database 114. For example, the communication module 106 may create a record in the attribute database 114 that indicates an account identifier, e.g., a number, and the user attribute data.

The communication module 106 may store data identifying when the second user device 116c captured the user attribute data, when the user attribute analysis system 102 received the user attribute data, or both. For instance, the communication module 106 may include time and date information in the record, stored in the attribute database 114, for the user attribute data.

A feedback module 108, during a time period $T_C$, analyzes the target attributes stored in the target attribute database 112 and the user attribute data stored in the attribute database 114 to determine an attribute prompt. For instance, the feedback module 108 uses the ranking of the target attributes stored in the target attribute database 112 to select a predetermined number of the highest ranked target attributes, e.g., for the second user. The feedback module 108 compares the highest ranked target attributes with the user attribute data for a particular user, e.g., the second user, to determine an attribute prompt specific to the second user. The feedback module 108 provides the attribute prompt, at time TD, to the second user device 116c to cause the second user device 116c to present the attribute prompt to the second user. The feedback module may use any appropriate method to determine the attribute prompt. For instance, the feedback module 108 may use a multiple regression-based technique to determine the attribute prompt.

The second user device 116c receives the attribute prompt, e.g., instructions to generate a user interface. The second user device 116c presents the attribute prompt to the second user, e.g., using the instructions to generate the user interface that includes the prompt for the second user. The prompt may be a visual prompt, an audible prompt, a haptic prompt, or a combination of two or more of these. The prompt may be any appropriate type of prompt.

In some implementations, the feedback module 108 may determine a target attribute for a user based on a role of the user. For instance, the feedback module 108 may determine that the second user works for a particular entity, has a particular position for the particular entity, or both. The feedback module 108 may determine a target attribute for the second user using the particular entity, the particular position, or both.

The target attribute module 104 may associate, with each of the target attributes in the target attribute database 112, an entity name for an entity for which the target attribute was defined. The target attribute module 104 may associate, with each of the target attributes in the target attribute database 112, a name of a particular position to which the target attribute corresponds. For instance, when a target attribute is for a chief operating officer position, the target attribute module 104 may create a record for the target attribute in the target attribute database 112 that includes an identification of "chief operating officer." The target attribute module 104 may associate each target attribute with multiple entities, multiple positions, or both.

In some examples, when the feedback module 108 determines that the second user worked for a particular entity, the feedback module 108 may select target attributes defined by the first user that works for the particular entity or otherwise defined the target attributes on behalf of the particular entity. The feedback module 108 may determine a ranking of target attributes in the target attribute database 112 that were defined by the first user and other users who defined target attributes on behalf of the particular entity. The feedback module may select the predetermined number of target attributes from the target attributes defined for the particular entity and use those target attributes to generate the attribute prompt for the second user.

When the feedback module 108 determines that the second user has a particular position, the feedback module 108 may select one or more target attributes that apply to that particular position. For instance, the feedback module 108 may determine that the second user is a chief operating officer and select target attributes that correspond to a chief operating officer position. The feedback module 108 may determine a ranking of the selected attributes and use a predetermined number of the highest ranked attributes to generate the attribute prompt for the second user.

In some implementations, the user attribute analysis system 102 can receive data representing best practices, e.g., target attributes, from the first user device 116a operated by a first user, e.g., a Type A User. The user attribute analysis system 102 may use the best practices to determine feedback to provide to the second user device 116c operated by a second user, e.g., a Type B User. In some implementations, a best practice may be a method that the first user identifies as the most appropriate method to accomplish a particular result. For example, a retail organization may use the user attribute analysis system 102 to improve a quality of the performance of its customer-facing staff, e.g., second users, by receiving input from other people, e.g., first users such as managers, that identifies best practices for how the customer-facing staff should interact with the customers. For instance, the target attribute module 104 may receive data indicating target attributes of how to greet customers courteously, how to respond to sales objections, and how to finalize a deal or a purchase. Some examples of the first users may include vendors, co-workers, e.g., supervisors, and potential customers.

For example, the target attribute module 104 may receive the data indicating the target attributes from the first user devices 116a operated by the first users. The target attribute module 104 stores at least some of the data in the target attribute database 112.

The communication module 106 receives user attribute data from second user devices 116c operated by the customer-facing staff, e.g., second users. In response to receipt of the user attribute data, the feedback module 108 determines that the customer-facing staff work for the retail organization and determines the target attributes for the retail organization, e.g., how to greet customers courteously, how to respond to sales objections, and how to finalize a deal or a purchase.

The feedback module 108 determines differences, for a particular customer-facing staff, between the customer-facing staff's user attribute data and the target attributes for the retail organization. The feedback module 108 may use the differences to determine that the customer-facing staff greets customers courteously according to a target attribute and does not responds to sales objections or finalize a deal according to corresponding target attributes.

The feedback module 108 determines a ranking of the target attributes. For instance, the feedback module 108 may determine that greeting customers courteously has a highest ranking, responding to sales objections has a second highest ranking, and finalizing a deal or a purchase has the lowest ranking.

The feedback module 108 determines an attribute prompt using the ranking. For example, the feedback module 108 may determine that since the differences indicate alignment with the highest ranking attribute, the feedback module 108 should generate the attribute prompt for the second highest ranking target attribute, e.g., responding to sales objections.

In some examples, the feedback module 108 may determine that the user attribute data includes data that aligns with a subset of the target attributes. For instance, the feedback module 108 may determine that the user attribute data includes data representing the customer-facing staff's interactions with customers.

In these examples, the feedback module 108 determines an attribute prompting using the subset of the target attributes. For example, the feedback module 108 determines that the customer-facing staff greets customers courteously and generates an attribute prompt based on that target attribute and the corresponding user attribute data.

The feedback module 108 may determine user attributes using keywords from the user attribute data. For instance, the feedback module 108 may analyze the user attribute data for the customer-facing staff and from the attribute database 114 to determine whether one or more keywords are included in the user attribute data. The feedback module 108 may determine the keywords by analyzing the target attributes in the target attribute database 112, e.g., by analyzing the target attributes specific to the customer-facing staff that are stored in the target attribute database 112.

The feedback module 108 uses the determined keywords to determine the user attribute data that also includes the keywords and whether the user attribute data includes second keywords that indicate alignment or non-alignment with the target attribute. For instance, the feedback module 108 may determine a keyword of "greeting" using the target attribute data and any appropriate synonyms, alternative expressions, or other appropriate equivalents. The feedback module 108 may identify user attribute data, e.g., a record in the attribute database 114, that includes the keyword, e.g., a record indicating that "I successfully greeted all of my customers courteously today."

The feedback module 108 analyzes the user attribute data to determine whether the user attribute data includes at least one of the second keywords. For instance, the feedback module 108 determines whether the user attribute data includes positive or negative keywords, e.g., as the second keywords, that indicate a likelihood that the user attribute data indicates alignment or non-alignment, respectively, with the target attribute. The feedback module 108 may determine that the user performed the target attribute based on the use of "successfully" and generate an attribute prompt in response. One example of an attribute prompt may be "Nice Job. How do you keep moving?"

The user attribute analysis system 102 may include an interconnection module 110 that determines connections between users identified in the target attribute database 112, the attribute database 114, or both. For instance, the interconnection module 110 may analyze data in the target attribute database 112, the attribute database 114, or both, to determine users with similar target attributes. The interconnection module 110 may determine that two users with similar target attributes should be introduced, e.g., to enable the two users to discuss the attribute.

For instance, a school, e.g., a college, university, or online learning institution, may use the user attribute analysis system 102 to enable current students, prospective students, or both, to understand and use particular study habits, e.g., as target attributes. The interconnection module 110 may identify a current student that has achieved a target attribute, e.g., a particular study habit, and a prospective student, e.g., a second user, with user attribute data indicating a discrepancy from the target attribute, e.g., that the prospective student has not achieved the particular study habit. The current student may be a second user, a first user, e.g., who defines the target attribute, or both.

The interconnection module 110 may determine whether the current student and the prospective student are associated with the same entity. For instance, the interconnection module 110 may determine that the current student is currently attending a particular university and that the prospective student will attend the particular university, e.g., in the fall.

The interconnection module 110 may provide a message to the prospective student indicating contact information for the current student to enable the prospective student to communicate with the current student, e.g., about the particular study habit. The message may indicate the target attribute, e.g., the particular study habit.

The interconnection module 110 may provide the message to enable the prospective student to discuss the attribute with the current student as part of an attribute prompt. For instance, the feedback module 108 may determine target attributes for the prospective student, e.g., specific to the prospective student attending the particular university. The user attribute analysis system 102 may receive data defining the target attributes from user devices 116a-c operated by professors, academic advisors, teachers, or administrative staff, each of which work for the particular organization, or a combination of two or more of these, e.g., as first users. The feedback module 108 may determine target attributes as setting aside time for reading and when and how long to study.

The feedback module 108 determines that the prospective student should receive an attribute prompt for the particular study habit and sends data representing the particular study habit to the interconnection module 110. The interconnection module 110 uses the data representing the particular study habit, e.g., target attribute, to determine other users who have achieved the particular study habit or are working toward achieving the particular study habit. In response, the interconnection module 110 enables the prospective student to communicate with at least one of the other users, e.g., the current student.

In some examples, the interconnection module 110 determines that the prospective student and the other users should communicate and provides the feedback module 108 with data representing the prospective student and the other users. The feedback module 108 uses the data to enable the prospective student to communicate with at least one of the other users, e.g., the current student.

In some examples, the user attribute analysis system 102 may provide feedback to prospective students that identifies target attributes for the prospective student to gain admission to a particular college or university, e.g., higher education school. For instance, the user attribute analysis system 102 may provide feedback that identifies particular practices a prospective student should perform, such as extracurricular activities or volunteer work, which will increase the prospective student's chances of being accepted at the particular college or university.

The user attribute analysis system 102 may determine different best practices for different persons associated with the particular university. For instance, the user attribute analysis system 102 may determine teaching attributes for a professor or teacher's assistant, studying attributes for a student, and working attributes for an administrative staff employee.

In some implementations, when a particular second user has multiple roles, the user attribute analysis system 102 may provide attribute prompts for each of the multiple roles. For instance, the user attribute analysis system 102 may provide a second user, who is both a teacher's assistant and a student, with attribute prompts specific to target attributes for both teachers and students. The user attribute analysis system 102 may generate instructions for presentation of the attribute prompts in a single user interface, a separate user interface for each target attribute, or both.

In some examples, the user attribute analysis system 102 may receive user attribute data from another system, e.g., separate from the user devices 116a-c. For instance, when the user attribute analysis system 102 stores information for students in the attribute database 114, the user attribute analysis system 102, e.g., the communication module 106, may receive grade information directly from a second user or from another system that includes a grade database. The other system may be operated on behalf of a particular school some of the students attend. The user attribute analysis system 102 may access grade information for a particular second user from a database in another system only when settings for the particular second user explicitly allow the user attribute analysis system 102 to access that particular second user's grade information.

The feedback module 108 or the interconnection module 110, or both, may analyze the grade information, e.g., as some of the user attribute data for a particular second user, and user attribute data received from a second user device 116c operated by the particular second user to determine target attributes for the particular second user, e.g., which the particular second user may use to improve his grades. For instance, the interconnection module 110 may determine other second users with similar grades and similar previous attributes as those of a particular second user and determine the target attributes those other second users used to improve their grades. The interconnection module 110 may identify a first student, e.g., a current student or a previous student, who had difficulty with statistics and determine that the first student used a tutoring service. The feedback module 108 may determine that the tutoring service, actions learned by the first student, or both, are target attributes for a second student who is having difficulty with statistics. The feedback module 108 generates an attribute prompt using one or more of the target attributes and provides the attribute prompt to a user device operated by the second student. The first student and the second student may attend the same school campus, different campuses of a particular school, or different schools.

In some implementations, the interconnection module 110 may use historical data for a user. For instance, the interconnection module 110 may determine that the prospective student should work on a particular target attribute while the current student previously achieved the particular target attribute, e.g., one or two years previously. The current student may be currently working on a different target attribute. The interconnection module 110 enables the current student and the prospective student to discuss the particular target attribute in response to determining that the current student previously achieved the particular attribute.

The interconnection module 110 may provide a request prompt to a user device operated by the current student before enabling the current student and the prospective student to discuss the target attribute. For example, the interconnection module 110 may request the current student's permission to share contact information with the prospective student, determine user settings for the current student that indicate whether or not the interconnection module 110 may share the current student's contact information, or both.

In some examples, the interconnection module 110 may enable users who are physically geographically dispersed to communicate. For instance, the interconnection module 110 may determine, for a workforce of an organization, which employees of the organization should have the same target attributes and enables employees that should have the same target attribute to communicate. The interconnection module 110 may determine that the employees would not otherwise communicate because of being physically geographically dispersed.

In some implementations, the target attribute module 104 may determine target attributes or a ranking of target attributes via a voting process. For instance, the target attribute module 104 may determine a list of target attributes and provide the list to the first user device 116a to enable the first user to select particular target attributes from the list of target attributes. The selected target attributes may be for a specific entity, e.g., which employs the first user, may be general to any entity, or both.

In some implementations, the target attribute module 104 may determine a geographic location to associate with a target attribute. For instance, the target attribute module 104 may determine that first users in a first physical geographic location prefer one target attribute and first users in a second physical geographic location prefer a second target attribute. The feedback module 108, when determining feedback for a second user, determines the physical geographic location of the second user and the target attributes specific to that physical geographic location of the second user.

In some implementations, the user attribute analysis system 102 may receive data representing voice input from users. For instance, the second user device 116c may prompt a second user for input identifying user attribute data using a display, a speaker, or both. In response, the second user device 116c, e.g., a microphone included in the second user device 116c, may capture audio signals that include utterances spoken by the second user. The second user device 116c provides the audio signals to the user attribute analysis system 102.

In some implementations, the second user device 116c may include some of the user attribute analysis system 102. For instance, the second user device 116c may include the communication module 106, the feedback module 108, target attribute data for the second user, and user attribute data for the second user. The second user device 116c may receive the user attribute data using the communication module 106, e.g., in which the communication module 106 prompts the second user for the user attribute data. The second user device 116c may analyze the user attribute data for the second user using the feedback module 108 to determine an attribute prompt. The second user device 116c may include target attribute data representing target attributes specific to the second user.

Some examples of a second user device 116c that includes the communication module 106 and the feedback module 108 include wearable attribute tracking devices, smart phones, and tablets. A wearable attribute tracking device may include a smart watch, a virtual reality headset, or smart glasses.

The second user device 116c may provide haptic feedback, e.g., vibrations, based on analysis of the user attribute data. The second user device 116c may provide the haptic feedback in real-time. For instance, the second user device 116c may monitor utterances spoken by the second user using a microphone and provide haptic feedback upon detecting user attributes in the spoken utterances that correspond to target attributes. For instance, when the second user device 116c has a target attribute of greeting customers courteously and detects a spoken utterance of "hello" from the second user, the second user device 116c may provide haptic feedback, e.g., since the second user did not greet the customer with "hello, how may I help you today?"

In some implementations, the feedback module 108 may select a video as part of an attribute prompt. For instance, the feedback module 108 may determine a video that describes a technique the second user may use to achieve a target attribute. The feedback module 108 may provide instructions to the second user device 116c to cause the second user device 116c to present the selected video in a graphical user interface. The instructions may include data representing the video or a link to a location at which the video is stored, e.g., a uniform resource locator.

The user attribute analysis system 102 iteratively receives user attribute data and, in response, provides attribute prompts. The user attribute analysis system 102 may learn, as part of the iterative process, which attribute prompts or which types of attribute prompts have a highest likelihood of causing a change to the user attribute data, reducing differences between the user attribute data and a target attribute, or both.

For instance, the user attribute analysis system 102 may analyze the user attribute data for a particular second user and attribute prompt data representing attribute prompts presented to the particular second user, e.g., using time data associated with the user attribute data and the attribute prompt data. The user attribute analysis system 102 may determine for which attribute prompts the subsequent user attribute data was most similar to target attribute data or for which attribute prompts the subsequent user attribute data changed, from previous user attribute data, to more align with the target attribute data, e.g., differences were minimized. For example, the user attribute analysis system 102 may determine, using the subsequent user attribute data, that the user is likely closer to achieving the target attribute based on an attribute prompt when the subsequent user attribute data changed to more align with the target attribute data.

The user attribute analysis system 102 may analyze user attribute data and attribute prompt data for a predetermined period of time, e.g., months or a year, to account for discrepancies in the user attribute data. For instance, the user attribute analysis system 102 may determine that one particular subset of the user attribute data indicates movement away from a target attribute and does not align with other user attribute data and not to consider that particular subset of the user attribute data when determining which attribute prompts or types of attribute prompts have a highest likelihood of causing a change to the user attribute data, differences between the user attribute data and a target attribute, or both.

The user attribute analysis system 102 may determine types of prompts that have at least a threshold likelihood of a change to the user attribute data, reducing differences between the user attribute data and a target attribute, or both. For instance, the user attribute analysis system 102 may determine that providing attribute prompts at a particular time of day, after a duration of time when the user attribute data was received, or with particular types of contents, have a highest likelihood of causing a change to the user attribute data, reducing differences between the user attribute data and a target attribute, or both. For example, the user attribute analysis system 102 may determine to provide a particular second user device 116c with attribute prompts in the evening and to provide another second user device 116c with attribute prompts in the morning, when the attribute prompts are for the same target attribute.

During the iterative process, the user attribute analysis system 102 may receive the user attribute data for a particular second user from multiple different sources. For instance, the user attribute analysis system 102 may receive some of the user attribute data from the first user device 116a operated by a first user, e.g., a manager submitting attribute data for the user, some of the user attribute data from the second user device 116c operated by the particular second user, and some of the user attribute data from a third party system, e.g., grade data for the particular second user from a grade database.

In some implementations, the user attribute analysis system 102 uses data for another user when determining which attribute prompts to provide to a particular second user. For example, the user attribute analysis system 102 may determine attribute prompts based on a physical location of the particular second user, an entity to which the particular second user is related, e.g., which employs the particular second user, or a role of the particular second user when the other user has a similar or the same physical location, entity relationship, or role. In some examples, the user attribute analysis system 102 may determine that users in a particular role are more likely to respond to an attribute prompt at a particular time of day or with specific content and generate an attribute prompt for the particular second user, who has the particular role, using the particular time of day, the specific content, or both.

The user attribute analysis system 102, e.g., the feedback module 108, may determine whether changes in user attribute data for a particular second user, e.g., in grades, practices, or both, are indicative of a change to an attribute prompt type for the particular second user. For instance, the user attribute analysis system 102 may determine that the particular second user's grades improve by a predetermined amount and, in response, determine different a new attribute to provide to the second user device 116c operated by the particular second user.

In some implementations, the feedback module 108 may use case-based reasoning, rule-based systems, natural language analytics, or mathematical techniques such multiple linear regression to determine a likelihood an attribute prompt, e.g., feedback, will cause specific outcomes, e.g., receipt of particular user attribute data, types of user attribute data, changes to user attribute data, or a combination of two or more of these.

The user attribute analysis system 102 can be used by different types of entities to generate attribute prompts. For example, the user attribute analysis system 102 may provide feedback to second users concerning health and wellness best practices. In these examples, the target attribute module 104 may receive a target attribute list, which identifies one or more target attributes, from a first user with health or wellness expertise, or both.

The user attribute analysis system 102 is an example of a system implemented as computer programs on one or more computers in one or more locations, in which the systems, components, and techniques described herein are implemented. For instance, the user attribute analysis system 102 may include multiple servers each of which is located in a different physical location. In some implementations, one or more of the modules 104-110 may perform steps described above with reference to another of the modules 104-110.

The user attribute analysis system 102 may collect data in response to receipt of user input indicating a user's permission to collect data. For instance, when first used, the user devices 116a-c may prompt a user for permission to collect and analyze attribute data for the user. The user devices 116a-c may prompt the user for permission to send attribute data to the user attribute analysis system 102 for analysis. In some implementations, the user devices 116a-c, the user attribute analysis system 102, or both, may receive separate permission to store data for different types of attributes.

The user attribute analysis system 102 may store user attribute data in a way in which user identifiable information is removed. For example, a user's identity may be treated so that no personally identifiable information can be determined for the user.

Figure 2:
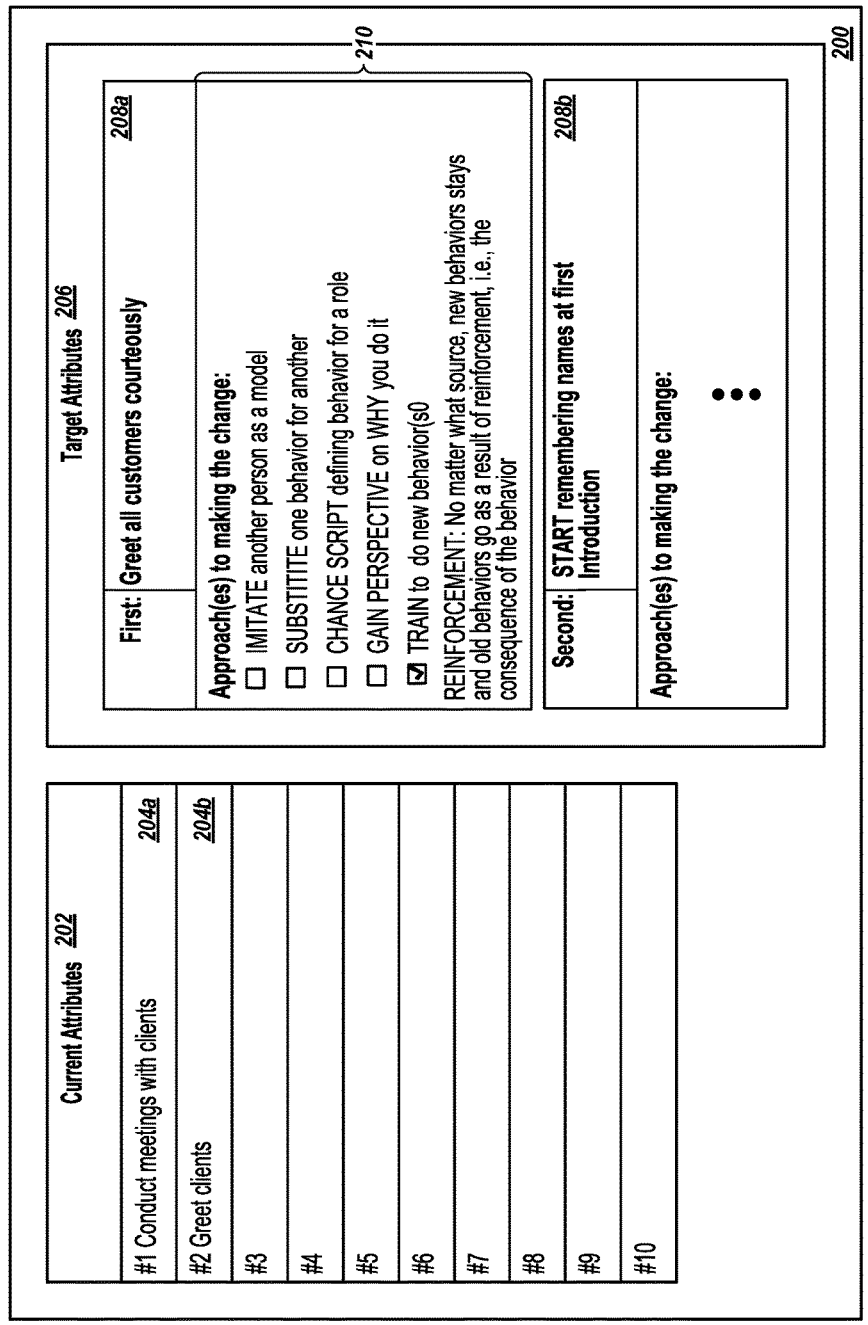
FIG. 2 is an example of a user interface that presents information about current attributes and target attributes for a user.

FIG. 2 is an example of a user interface 200 that presents information about current attributes and target attributes for a user. For instance, a user attribute analysis system may receive a uniform resource locator request from a user device and determine instructions for presentation of the user interface 200. The user attribute analysis system provides the instructions to the user device, in response to receipt of the uniform resource locator request, to cause the user device to present the user interface 200.

Upon presentation of the user interface 200, the user device may receive user input 204a-b, e.g., from a second user, indicating the current attributes of the user in a current attributes field 202 of the user interface 200. For instance, the user input 204a-b may indicate one or more practices the second user currently employs.

The practices may be specific to a particular entity, particular role, or both, of the second user. For example, the user input may define practices of the second user when the second user is working in a particular role, such as a student or an administrative professional.

The user interface 200 may include a target attribute field 206 that allows user input defining target attributes 208a-b for the second user. For instance, the user interface 200 may include a pop-up window that identifies a list of target attributes for the second user, e.g., specific to the particular entity, the particular role, or both, and allows user input indicating a selection of one of the target attributes from the list. The user device may populate the target attribute field 206 using the selected target attributes 208a-b.

In some examples, the user interface 200 includes target attributes identified by the user attribute analysis system. For instance, the user attribute analysis system may use the current attributes 202, the particular entity, the particular role, or a combination of two or more of these, to determine the target attributes 208a-b for the second user. The user attribute analysis system includes, in instructions for the presentation of the user interface 200, data representing the target attributes 208a-b. The user device uses the instructions to generate the user interface 200 that includes the target attributes 208a-b.

The user interface 200 may include a field 210 that allows user input of an approach for the second user to achieve the target attribute. In some examples, an option in the field 210 may be identified upon presentation of the user interface 200. For instance, the user attribute analysis system may indicate a selection of one of the options in the field 210.

In some implementations, portions of the user interface 200 may be presented at different times. For instance, the user device may cause presentation of the current attributes field 202 on a display and allow user input defining a scroll movement of the user interface 200 to cause presentation of the target attribute field 206.

In some examples, the user interface 200 may include multiple pages. For instance, a user device may present the current attributes field 202 on a first page, e.g., associated with a first uniform resource locator, that includes a "next" button. Upon receipt or user input indicating selection of the "next" button, the user device may present the target attributes field 206, or a portion of the target attributes field, e.g., which is associated with a second uniform resource locator.

Figure 3:
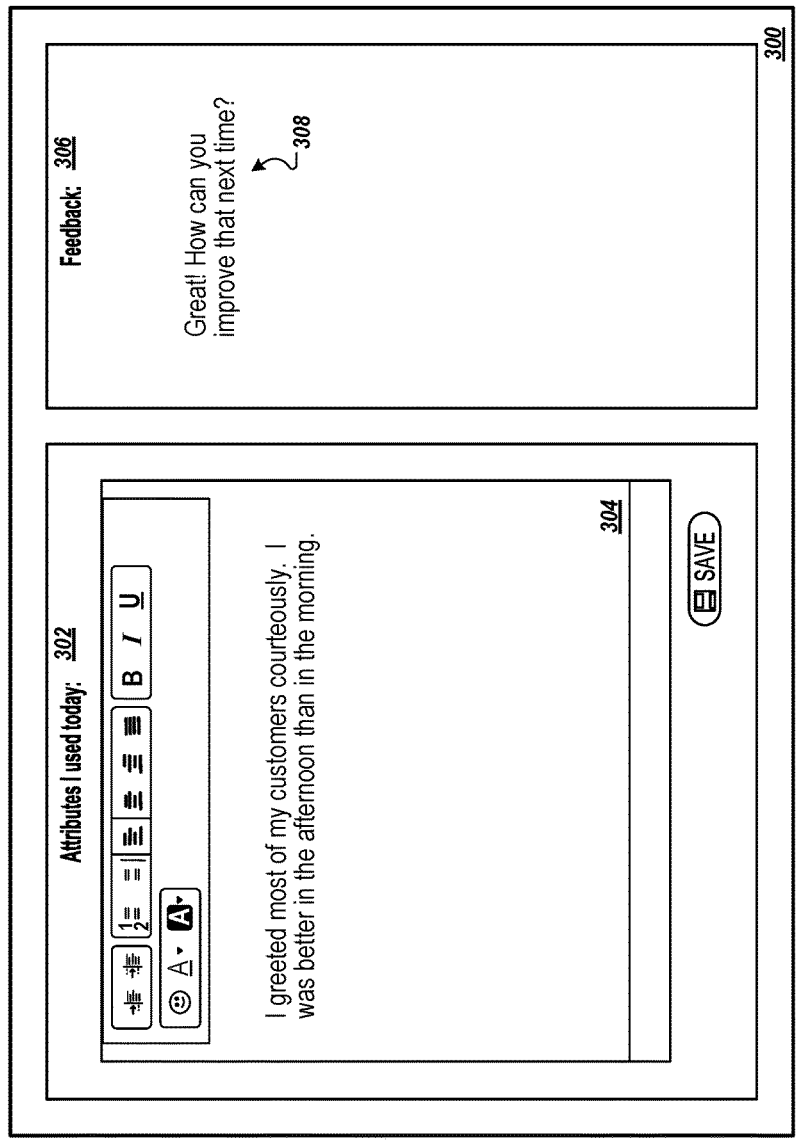
FIG. 3 is an example of a user interface that presents information about attributes used by a user and feedback presented to the user.

FIG. 3 is an example of a user interface 300 that presents information about attributes used by a user, e.g., the user attribute data, and feedback presented to the user, e.g., attribute prompts. For instance, the user interface 300 may include an attributes used field 302 that accepts user input describing actions performed by a particular second user. The attributes used field 302 may accept user input during multiple sessions for the particular second user, e.g., when each session is for a different day or portion of a day and describes the actions performed by the particular second user during the corresponding portion of the day.

Different user devices may present the user interface 300 across the multiple sessions. For example, a first user device may present the user interface 300 to the particular second user during a first session and receive corresponding user input in an attribute entry field 304. The first user device may send first user attribute data to a user attribute analysis system in response. A second, different user device may present the user interface 300 to the particular second user during a second session and receive corresponding second user input in the attribute entry field 304 describing one or more actions performed by the particular second user. The second, different user device may send second user attribute data to the user attribute analysis system in response.

In some examples, the attribute entry field 304 may accept user input defining actions a user performed to achieve a target attribute. For instance, the user input may describe an action performed by the user for a particular task, such as greeting customers, associated with the target attribute, e.g., greeting customers courteously.

The user attribute analysis system may receive data representing the user input from the user device. The user attribute analysis system may store the data in an attribute database, e.g., in a record for the user.

The user attribute analysis system, the user device, or both, may receive user input defining the attributes using any appropriate type of user input. For instance, the user input may be keyboard input, touch screen input, visual input, e.g., captured by a camera, or speech input, e.g., captured by a microphone. In some examples, the user device or the user attribute analysis system may analyze the user input to determine the attributes.

For example, the user device may continuously monitor input received by a microphone, included in the user device, for utterances spoken by the user. When the user device detects an utterance spoken by the user, the user device may determine whether the utterance indicates an attribute for the user and cause the storage of data representing the attribute in a memory, e.g., in an attribute database, when the utterance indicates an attribute for the user.

In some examples, when the user device is a virtual reality headset, the user device may cause a presentation of the user interface 300, e.g., a different version of the user interface with similar fields, in a simulated environment. For instance, the virtual reality headset may present a user interface with an attribute entry field 304 that allows user input in a three dimensional environment.

The user interface 300 includes a feedback field 306 that indicates an attribute prompt 308. For example, the user device may provide the attribute used data, e.g., from the attribute entry field 304, to a feedback module that analyzes the attribute used data to determine the attribute prompt 308. The user device receives, from the feedback module, instructions for the presentation of the feedback field 306, alone or with instructions to present the entire user interface 300, and uses the instructions to cause a presentation of the feedback field 306, e.g., on a display integrated into the user device, an external display, or a spoken presentation of the feedback, to name a few examples.

In some implementation, the attribute entry field 304 and the feedback field 306 may be presented separately, audibly, or both. For instance, the user device may audibly prompt a user for user input indicating an attribute used. The user device provides data representing the attribute used to a feedback module and, in response, receives instructions to cause an audible presentation of the attribute prompt to the user, e.g., using a speaker included in or external to the user device.

In some implementations, the user device may store the attribute used data, e.g., the user attribute data, the attribute prompt data, or both, in a local memory of the user device. For instance, the user device may provide the user attribute data to the user attribute analysis system and, in response, receive data representing an attribute prompt to present to a user. The user device may store the user attribute data and the data representing the attribute prompt in a memory for later presentation to the user, e.g., in response to user input requesting presentation of the data, for presentation of the attribute prompt at a time identified in the data representing the attribute prompt, or both. The time identified in the data representing the attribute prompt may be a time at which the user attribute analysis system determines the attribute prompt is most likely to cause a subsequent change to user attribute data, e.g., attribute used data received after the presentation of the attribute prompt.

Figure 4:
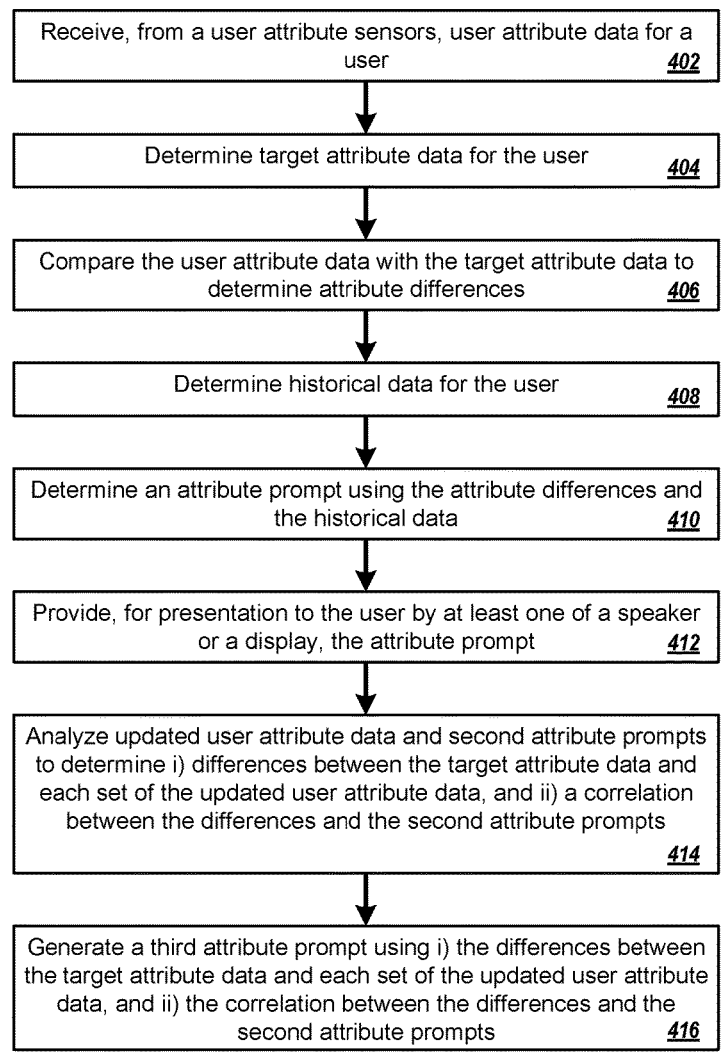
FIG. 4 is a flow diagram of a process for providing an attribute prompt for presentation.

FIG. 4 is a flow diagram of a process 400 for providing an attribute prompt for presentation. For example, the process 400 can be used by the user device 116c, e.g., a wearable attribute tracking device, from the environment 100.

A user device receives, from a user attribute sensors, user attribute data for a user (402). The user attribute data may be for a user wearing a wearable attribute tracking device.

For instance, the user attribute data may be for a user wearing a virtual reality headset. The virtual reality headset may determine the user attribute data using user input from the user. The user input may be audio signals, video signals, e.g., that indicate actions of the user, or other appropriate types of user input.

The user device determines target attribute data for the user (404). For instance, the user device retrieves, from a memory, the target attribute data. The user device may receive the target attribute data from a user attribute analysis system. The user attribute analysis system may determine the target attribute data using a role of the user, e.g., an entity which employs the user, an entity to which the user is related such as a school, a particular position of the user, or a combination of two or more of these. In some examples, the user device may determine the target attribute data using user input, e.g., from a user interface.

The user device compares the user attribute data with the target attribute data to determine attribute differences (406). For instance, the user device may use speech recognition to determine words included in spoken utterances. The user device may identify keywords in the spoken utterances that correspond to the target attribute data. The user device determines, using the words from the spoken utterances, the attribute differences between the user attribute data and the target attribute data, e.g., that indicate whether the user is likely achieving the target attribute or not.

The user device determines historical data for the user (408). For example, the user device may determine previous user attribute data for the user and attribute prompts sent in response to the previous user attribute data. The user device may determine, using the historical data, which attribute prompts have a greatest likelihood of affecting subsequent user attribute data, e.g., the greatest likelihood that the user will change an action in response to the attribute prompt.

In some examples, the user device may analyze the historical data to determine a time, a frequency, or both, regarding presentation of an attribute prompt for the attribute differences. For instance, the user device may determine that an attribute prompt presented ten minutes after receipt of the user attribute data is more likely to reduce the attribute differences than an attribute prompt presented an hour after receipt of the user attribute data.

In some implementations, the user device may determine user preferences. The user preferences may indicate when the user device should provide an attribute prompt, how frequently the user device should provide an attribute prompt, or both.

The user device determines an attribute prompt using the attribute differences and the historical data (410). For instance, the user device selects the attribute prompt from a group of attribute prompts using the attribute differences and the historical data. In some implementations, the user device generates the attribute prompt dynamically, e.g., using machine learning with the attribute differences and the historical data as input.

The user device provides, for presentation to the user by at least one of a speaker or a display, the attribute prompt (412). For instance, the user device generates instructions for the presentation of the attribute prompt. The user device provides the instructions to the speaker or the display. In some examples, the user device may generate separate instructions for both the speaker and the display and provide the corresponding instructions to the speaker and the display.

The user device analyzes updated user attribute data and second attribute prompts to determine i) differences between the target attribute data and each set of the updated user attribute data, and ii) a correlation between the differences and the second attribute prompts (414). For example, the user device iteratively receives updated user attribute data from the user attribute sensors. For each set of the updated user attribute data, the user device determines a second attribute prompt and causes the presentation of the second attribute prompt to the user.

The user device may determine the differences between the target attribute data and each set of the updated user attribute data when generating the corresponding second attribute prompt. The user device may store data indicating the differences in a memory, e.g., in a database. The user device may store the updated user attribute data in the same memory or a different memory.

The user device may determine, for each set of the updated user attribute data, a preceding prompt from the attribute prompt and the second attribute prompts. For instance, the user device may determine which attribute prompt was presented prior to receipt of the updated user attribute data, e.g., an hour, a day, or a week previously without the presentation of any other attribute prompts between presentation of the prior attribute prompt and the receipt of the updated user attribute data.

The user device determines a correlation between the differences for the updated user attribute data and the prior attribute prompt. The user device may use the correlation to determine a likely effectiveness of the prior attribute prompt. For instance, when the prior attribute prompt does not change the differences for the updated user attribute data, compared to historical differences between user attribute data for the user and the target attribute data, the user device may determine that there is little correlation between the differences and the prior attribute prompt and that the prior attribute prompt was not likely effective.

The user device generates a third attribute prompt using i) the differences between the target attribute data and each set of the updated user attribute data, and ii) the correlation between the differences and the second attribute prompts (416). For instance, the user device uses the likely effectiveness to determine whether a particular prompt, a particular type of prompt, or both, were likely effective. When the user device determines that the prior attribute prompt was likely effective, e.g., and the likely effectiveness satisfies a threshold value, the user device may use the same or a similar prompt as the prior attribute prompt for the third attribute prompt. When the user device determines that the prior attribute prompt was not likely effective, e.g., that the likely effectiveness does not satisfy the threshold value, the user device uses a different attribute prompt than the prior attribute prompt for the third attribute prompt.

The order of steps in the process 400 described above is illustrative only, and providing an attribute prompt for presentation can be performed in different orders. For example, the user device may determine the target attribute data and then receive the user attribute data.

In some implementations, the process 400 can include additional steps, fewer steps, or some of the steps can be divided into multiple steps. For example, the user device may perform steps 402 through 412 without performing steps 414 or 416. In some examples the user device may provide the third attribute prompt for presentation to the user.

In some implementations, a user attribute analysis system may receive the user attribute data from the user device and perform the process 400. For instance, the user attribute analysis system may generate instructions for the presentation of the attribute prompt and provide the instructions to the user device after preforming steps 402 through 410.

In some implementations, a user attribute analysis system may automatically detect problematic attributes of a particular user, e.g., based on input received from another users such as a supervisor or a teacher. A feedback generator may analyze the input and determine the problematic practices, e.g., using historical analysis of other second users and their practices and correlations between those practices and the practices of the particular user.

In some implementations, a system may receive first data defining best practices from a first device operated by a first user, the best practices being for a particular entity, store the first data in a database and associate the first data with the particular entity in the database, receive second data from a second device operated by a second user associated with the particular entity, the second data defining practices of the second user with respect to the particular entity, store the second data in the database and associate the second data with the second user and the particular entity, automatically determine differences between the best practices for the particular entity and the practices of the second user with respect to the particular entity, automatically determine feedback for actions the second user should perform to change the practices of the second user with respect to the particular entity based on the differences, and provide the feedback to the second device operated by the second user. In some implementations, the second user is employed by the entity.

In some implementations, a system may receive first data defining best practices from a first device operated by a first user, the best practices being for a particular entity, store the first data in a database and associate the first data with the particular entity in the database, receive second data from a second device operated by a second user associated with the particular entity, the second data defining practices of the second user with respect to the particular entity, store the second data in the database and associate the second data with the second user and the particular entity, automatically determine a third user with practices that are the same as the practices of the second user with respect to the particular entity, and facilitate communication between the second user and the third user. In some implementations, the third user may have the desired best practices as the best practices for the particular entity. For instance, the particular entity may employ the second user and the third user. In some examples, the practices of the third user are current practices of the third user. In some examples, the practices of the third user are past practices of the third user. In some implementations, the third user currently employs the best practices for the particular entity.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 5:
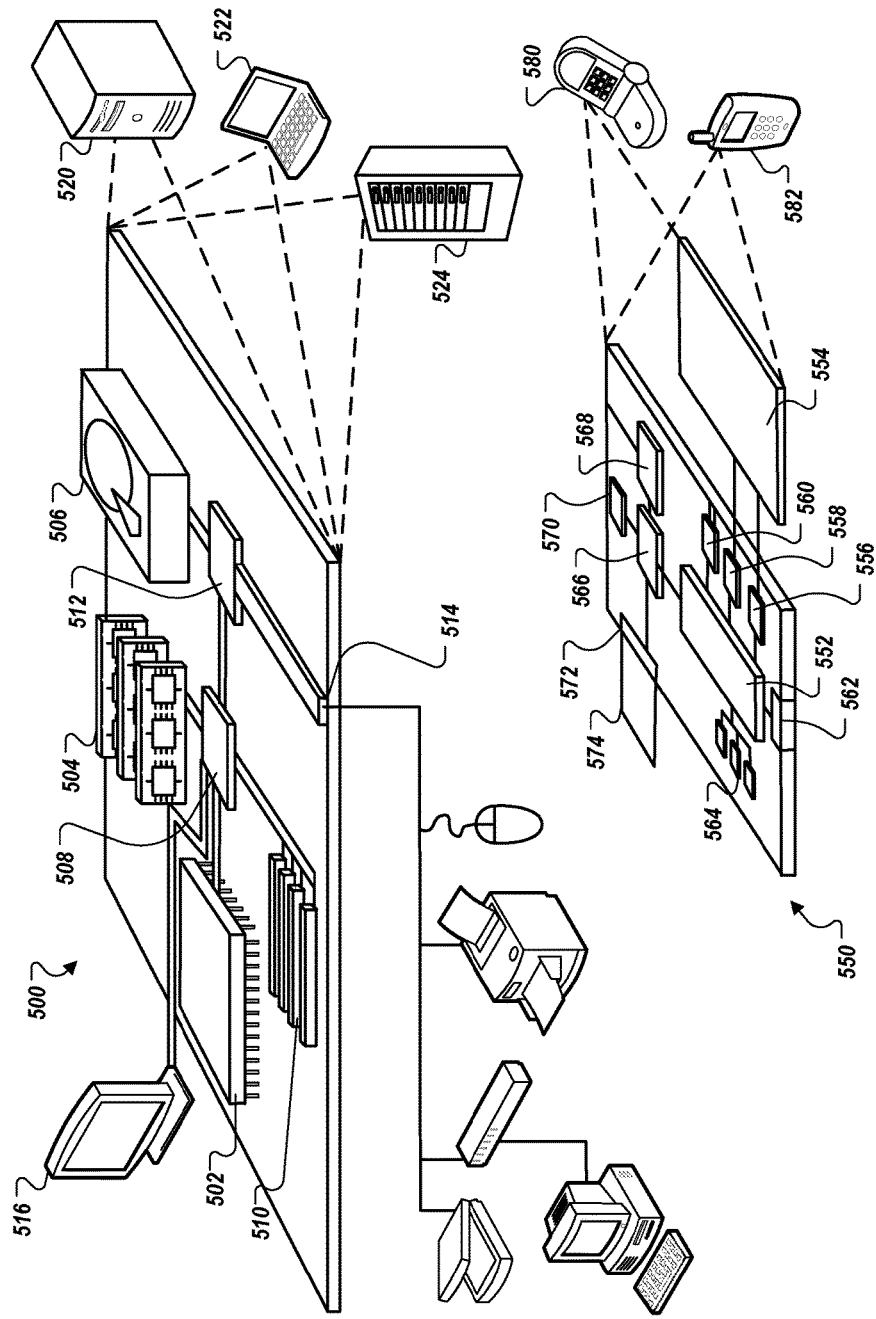
FIG. 5 is a block diagram of a computing system that can be used in connection with computer-implemented methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A network connected attribute analysis system comprising:
    a first database that identifies entities, best practices, and data that associates each of the entities with at least one of the best practices;
    a second database that identifies user attributes;
    a data processing apparatus; and
    a non-transitory computer readable storage medium in data communication with the data processing apparatus and storing instructions executable by the data processing apparatus and upon such execution cause the data processing apparatus to perform operations comprising:
        receiving, via a network from a first device operated by a first user, first data defining a best practice for a particular entity from the entities;
        storing, in the first database, the first data as one of the best practices and data that associates the first data with the particular entity;
        receiving, via the network from a second device operated by a second user associated with the particular entity, second data that defines attributes of the second user with respect to the particular entity;
        storing, in the second database, the second data and associating the second data with the second user and the particular entity;
        in response to receiving the second data that defines the attributes of the second user with respect to the particular entity, automatically determining, using first data from the first database and second data from the second database, differences between the best practices for the particular entity and the attributes of the second user with respect to the particular entity;
        automatically determining, using the differences, a question to provide to the second device for actions the second user can perform to change the attributes of the second user with respect to the particular entity and to increase a likelihood that the second user will perform the best practice of the particular entity; and
        providing instructions for presentation of the question to the second device operated by the second user.

2. The network connected attribute analysis system of claim 1, the operations comprising:
    receiving, from the second device operated by the second user, third data that describes actions performed by the second user with respect to the particular entity;
    determining whether the actions performed by the second user with respect to the particular entity indicate a change to the attributes of the second user;
    in response to determining that the actions performed by the second user with respect to the particular entity do not indicate a change to the attributes of the second user:
        determining second feedback to provide to the second user for second actions the second user can perform to change the attributes of the second user with respect to the particular entity and to increase a likelihood that the second user will perform the best practice of the particular entity; and
        providing instructions for presentation of the second feedback to the second device operated by the second user; and
    in response to determining that the actions performed by the second user with respect to the particular entity indicate a change to the attributes of the second user:
        determining new attributes for the second user with respect to the particular entity based on the action;
        automatically determining, using first data from the first database and second data from the second database, second differences between the best practices for the particular entity and the new attributes of the second user with respect to the particular entity in response to determining the new attributes for the second user with respect to the particular entity;
        automatically determining, using the second differences, second feedback to provide to the second user for actions the second user can perform to change the new attributes of the second user with respect to the particular entity and to increase a likelihood that the second user will perform the best practice of the particular entity; and
        providing instructions for presentation of the second feedback to the second device operated by the second user.

3. The network connected attribute analysis system of claim 1, the operations comprising:
    repeatedly receiving updated second data that defines attributes of the second user;
    in response to each of two or more receipts of the updated second data:
        determining a second question using the respective updated second data; and
        providing instructions for presentation of the second question;
    analyzing the updated second data and the second questions to determine i) differences between the first data and each set of the updated second data, and ii) a correlation between the differences and the second questions;

generating a third question using i) the differences between the first data and each set of the updated second data, and ii) the correlation between the differences and the second questions; and providing, for presentation to the second user, the third question.

4. The network connected attribute analysis system of claim 3, wherein:

analyzing the updated second data and the second questions to determine i) the differences between the first data and each set of the updated second data, and ii) the correlation between the differences and the second questions comprises:

determining, for each set of the updated second data, a difference between the best practice indicated by the first data and the attributes of the second user indicated by the updated second data;

determining, for each set of the updated second data, a preceding question from the question and the second questions;

determining, for each set of the updated second data, a correlation between a) the difference between the best practice and the attributes of the second user and b) the preceding question; and using the correlation to determine a likely effectiveness of each of the preceding questions; and generating the third question using i) the differences between the first data and each set of the updated second data, and ii) the correlation between the differences and the second questions comprises generating the third question using the likely effectiveness of each of the preceding questions.

5. The network connected attribute analysis system of claim 1, wherein:

the first database is a different database from the second database; and the first device is a different device from the second device.

6. A method comprising:

maintaining, by a network connected attribute analysis system comprising one or more computers, a first database that identifies entities, best practices, and data that associates each of the entities with at least one of the best practices;

maintaining, by the network connected attribute analysis system, a second database that identifies user attributes;

receiving, by the network connected attribute analysis system and via a network from a first device operated by a first user, first data defining a best practice for a particular entity from the entities;

storing, by the network connected attribute analysis system and in the first database, the first data as one of the best practices and data that associates the first data with the particular entity;

receiving, by the network connected attribute analysis system and via the network from a second device operated by a second user associated with the particular entity, second data that defines attributes of the second user with respect to the particular entity;

storing, by the network connected attribute analysis system and in the second database, the second data and associating the second data with the second user and the particular entity;

in response to receiving the second data that defines the attributes of the second user with respect to the particular entity, automatically determining, by the network connected attribute analysis system and using first data from the first database and second data from the second database, differences between the best practices for the particular entity and the attributes of the second user with respect to the particular entity;

automatically determining, by the network connected attribute analysis system and using the differences, a question to provide to the second user for actions the second user can perform to change the attributes of the second user with respect to the particular entity and to increase a likelihood that the second user will perform the best practice of the particular entity; and providing, by the network connected attribute analysis system and to the second device operated by the second user, instructions for presentation of the question.

7. The method of claim 6, comprising:

receiving, by the network connected attribute analysis system and from the second device operated by the second user, third data that describes actions performed by the second user with respect to the particular entity;

determining, by the network connected attribute analysis system, whether the actions performed by the second user with respect to the particular entity indicate a change to the attributes of the second user;

in response to determining that the actions performed by the second user with respect to the particular entity do not indicate a change to the attributes of the second user:

determining, by the network connected attribute analysis system, second feedback to provide to the second user for second actions the second user can perform to change the attributes of the second user with respect to the particular entity and to increase a likelihood that the second user will perform the best practice of the particular entity; and providing, by the network connected attribute analysis system and to the second device operated by the second user, instructions for presentation of the second feedback; and in response to determining that the actions performed by the second user with respect to the particular entity indicate a change to the attributes of the second user:

determining, by the network connected attribute analysis system, new attributes for the second user with respect to the particular entity based on the action;

automatically determining, by the network connected attribute analysis system and using first data from the first database and second data from the second database, second differences between the best practices for the particular entity and the new attributes of the second user with respect to the particular entity in response to determining the new attributes for the second user with respect to the particular entity;

automatically determining, by the network connected attribute analysis system and using the second differences, second feedback to provide to the second user for actions the second user can perform to change the new attributes of the second user with respect to the particular entity and to increase a likelihood that the second user will perform the best practice of the particular entity; and providing, by the network connected attribute analysis system and to the second device operated by the second user, instructions for presentation of the second feedback.

8. The method of claim 6, comprising:
repeatedly receiving, by the network connected attribute analysis system, updated second data that defines attributes of the second user;
in response to each of two or more receipts of the updated second data:
   determining, by the network connected attribute analysis system, a second question using the respective updated second data; and
   providing, by the network connected attribute analysis system, instructions for presentation of the second question;
analyzing, by the network connected attribute analysis system, the updated second data and the second questions to determine i) differences between the first data and each set of the updated second data, and ii) a correlation between the differences and the second questions;
generating, by the network connected attribute analysis system, a third question using i) the differences between the first data and each set of the updated second data, and ii) the correlation between the differences and the second questions; and
providing, by the network connected attribute analysis system and for presentation to the second user, the third question.

9. The method of claim 8, wherein:
analyzing the updated second data and the second questions to determine i) the differences between the first data and each set of the updated second data, and ii) the correlation between the differences and the second questions comprises:
   determining, for each set of the updated second data, a difference between the best practice indicated by the first data and the attributes of the second user indicated by the updated second data;
   determining, for each set of the updated second data, a preceding question from the question and the second questions;
   determining, for each set of the updated second data, a correlation between a) the difference between the best practice and the attributes of the second user and b) the preceding question; and
   using the correlation to determine a likely effectiveness of each of the preceding questions; and
generating the third question using i) the differences between the first data and each set of the updated second data, and ii) the correlation between the differences and the second questions comprises generating the third question using the likely effectiveness of each of the preceding questions.

10. A non-transitory computer readable storage medium having computer-executable instructions that when executed, by a network connected attribute analysis system, cause the network connected attribute analysis system to perform operations comprising:
maintaining a first database that identifies entities, best practices, and data that associates each of the entities with at least one of the best practices;
maintaining a second database that identifies user attributes;
receiving, via a network from a first device operated by a first user, first data defining a best practice for a particular entity from the entities;
storing, in the first database, the first data as one of the best practices and data that associates the first data with the particular entity;
receiving, via the network from a second device operated by a second user associated with the particular entity, second data that defines attributes of the second user with respect to the particular entity;
storing, in the second database, the second data and associating the second data with the second user and the particular entity;
in response to receiving the second data that defines the attributes of the second user with respect to the particular entity, automatically determining, using first data from the first database and second data from the second database, differences between the best practices for the particular entity and the attributes of the second user with respect to the particular entity;
automatically determining, using the differences, a question to provide to the second user for actions the second user can perform to change the attributes of the second user with respect to the particular entity and to increase a likelihood that the second user will perform the best practice of the particular entity; and
providing instructions for presentation of the question to the second device operated by the second user.

11. The computer readable storage medium of claim 10, the operations comprising:
receiving, from the second device operated by the second user, third data that describes actions performed by the second user with respect to the particular entity;
determining whether the actions performed by the second user with respect to the particular entity indicate a change to the attributes of the second user;
in response to determining that the actions performed by the second user with respect to the particular entity do not indicate a change to the attributes of the second user:
   determining second feedback to provide to the second user for second actions the second user can perform to change the attributes of the second user with respect to the particular entity and to increase a likelihood that the second user will perform the best practice of the particular entity; and
   providing instructions for presentation of the second feedback to the second device operated by the second user; and
in response to determining that the actions performed by the second user with respect to the particular entity indicate a change to the attributes of the second user:
   determining new attributes for the second user with respect to the particular entity based on the action;
   automatically determining, using first data from the first database and second data from the second database, second differences between the best practices for the particular entity and the new attributes of the second user with respect to the particular entity in response to determining the new attributes for the second user with respect to the particular entity;
   automatically determining, using the second differences, second feedback to provide to the second user for actions the second user can perform to change the new attributes of the second user with respect to the particular entity and to increase a likelihood that the second user will perform the best practice of the particular entity; and providing instructions for presentation of the second feedback to the second device operated by the second user.

12. The computer readable storage medium of claim 10, the operations comprising:

repeatedly receiving updated second data that defines attributes of the second user;

in response to each of two or more receipts of the updated second data:
  determining a second question using the respective updated second data; and
  providing instructions for presentation of the second question;

analyzing the updated second data and the second questions to determine i) differences between the first data and each set of the updated second data, and ii) a correlation between the differences and the second questions;

generating a third question using i) the differences between the first data and each set of the updated second data, and ii) the correlation between the differences and the second questions; and providing, for presentation to the second user, the third question.

13. The computer readable storage medium of claim 12, wherein:

analyzing the updated second data and the second questions to determine i) the differences between the first data and each set of the updated second data, and ii) the correlation between the differences and the second questions comprises:
  determining, for each set of the updated second data, a difference between the best practice indicated by the first data and the attributes of the second user indicated by the updated second data;
  determining, for each set of the updated second data, a preceding question from the question and the second questions;
  determining, for each set of the updated second data, a correlation between a) the difference between the best practice and the attributes of the second user and b) the preceding question; and
  using the correlation to determine a likely effectiveness of each of the preceding questions; and generating the third question using i) the differences between the first data and each set of the updated second data, and ii) the correlation between the differences and the second questions comprises generating the third question using the likely effectiveness of each of the preceding questions.

* * * * *